Jan. 10, 1939.   N. BOUVENG ET AL   2,143,756
MOTION PICTURE APPARATUS OF THE MAGAZINE TYPE
Filed Nov. 20, 1934   2 Sheets—Sheet 1
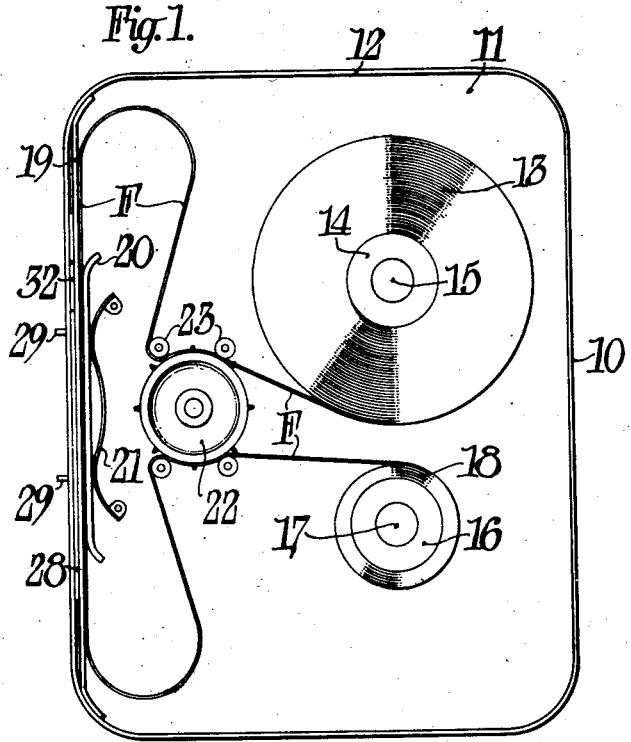
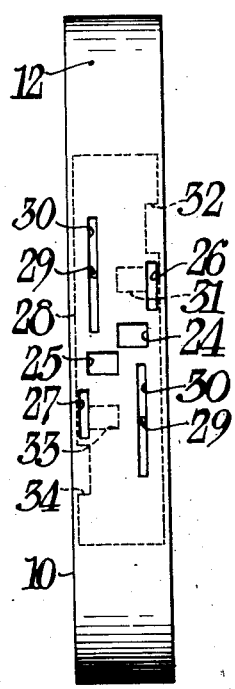
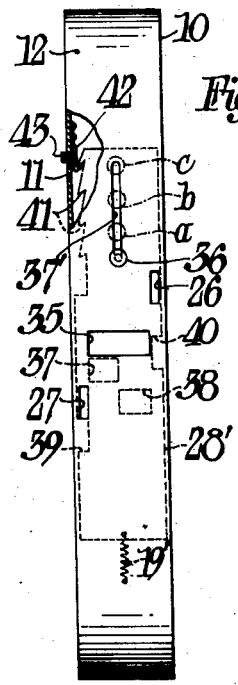
Inventors:
Nils Bouveng & George A. Gillette, Jr.,
Newton M. Perkins.
By Donald K. Stuart
Attorneys Jan. 10, 1939.    N. BOUVENG ET AL    2,143,756
MOTION PICTURE APPARATUS OF THE MAGAZINE TYPE
Filed Nov. 20, 1934    2 Sheets-Sheet 2
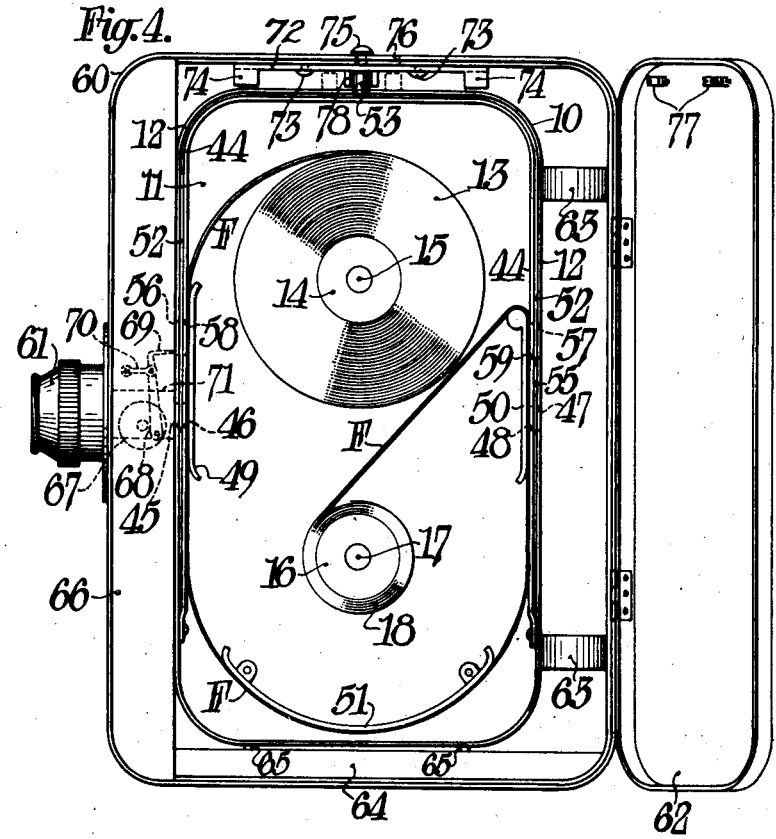
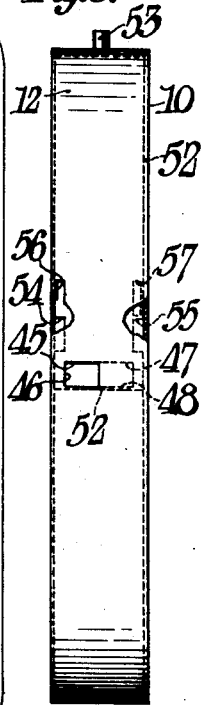
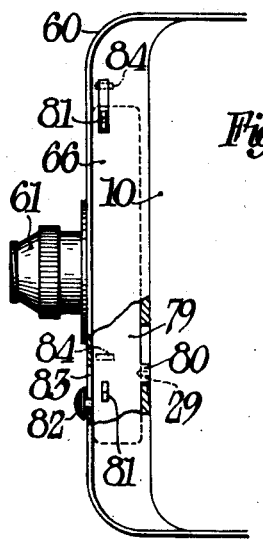
Inventors:
Nils Bouveng & George A. Gillette, Jr.
By Newton M. Perrine
Donald H. Stewart
Attorneys Patented Jan. 10, 1939

2,143,756

UNITED STATES PATENT OFFICE 2,143,756

MOTION PICTURE APPARATUS OF THE MAGAZINE TYPE

Nils Bouveng, Elga, Satsjabaden, Sweden, and George A. Gillette, Jr., Rochester, N. Y., assignors, by mesne assignments, to Eastman Kodak Company, Jersey City, N. J., a corporation of New Jersey Application November 20, 1934, Serial No. 753,910

14 Claims. (Cl. 88—16)

The present invention relates to motion picture apparatus of the magazine type and more particularly to motion picture magazines which are adapted for alternative exposure or projection of laterally adjacent rows of frames on a motion picture film strip.

Recent developments in the field of amateur motion picture photography have popularized a type of equipment by which two rows of frames or images may be exposed or projected in laterally adjacent positions on a motion picture film strip. The recent trend in "home movies" has also been toward apparatus of the magazine type. The United States patent of the co-inventor, Nils Bouveng, No. 1,984,111, discloses a film magazine adapted for alternative exposure of laterally adjacent portions of a film strip. However, prior structures in the prior art make no provision for light sealing a magazine by which longitudinal halves of the film may be exposed or projected in motion picture equipment.

The primary object of the present invention is the provision in a magazine of the aforementioned type of a shutter which can completely seal the magazine against light leakage and which may be operated to uncover laterally displaced exposure apertures in a wall of the magazine.

Another object of the present invention is the provision of a shutter on a magazine for simultaneously covering elongated slots for the reception of a film advancing tooth or claw and for alternatively uncovering such slots for a predetermined movement of the film.

A further object of the invention is the provision on a magazine of such a shutter which may cover both the exposure apertures and claw slots and which may be moved in either of opposite directions alternatively to uncover one aperture and one slot or which may be moved in the same direction alternatively to uncover one aperture and one slot.

An additional feature of the invention is the combination of a magazine having a shutter of the type described with a motion picture camera having a latch for locking the cover of the camera and cooperating with the shutter on the magazine so that alternative apertures or slots are uncovered when the magazine is inserted into the camera and the latch is moved to locking position.

A still further feature of the invention is the provision on a film magazine having a shutter for covering all of the openings in the magazine and movable in a predetermined direction alternatively to uncover appropriate openings, of a means between the shutter and magazine casing so that movement of the shutter in a direction opposite to the predetermined direction is prevented, thereby eliminating the possibility of double exposure of the same longitudinal strip portion of the film.

Other and further objects of the invention will be apparent to those skilled in the art as the disclosure of our invention is developed hereinafter.

The above-mentioned and other objects of the invention are attained in a magazine which is provided with laterally displaced openings and which has a movable shutter provided with openings located to register alternatively with the openings in the magazine. Said openings in the shutter are also arranged so that all of the openings of the magazine may be covered at one time.

The motion picture apparatus for receiving such a magazine is equipped with a locking mechanism movable to locking position for fastening the cover of the apparatus and at the same time connected to the shutter of the magazine so that said movement to locking position will effect the desired, appropriate, and alternate uncovering of the openings of the magazine.

Reference is hereby made to the accompanying drawings wherein similar reference characters designate similar elements, and wherein:

Fig. 1 is a side view of a film magazine according to the invention and with the cover removed for a better illustration of the internal parts.

Fig. 2 is a front view of the film magazine shown in Fig. 1.

Fig. 3 is a front view of a modified form of film magazine in which the shutter is movable in the same direction for alternative uncovering of the exposure aperture and in which a means is provided to prevent reverse movement of the shutter, a section of the magazine casing being broken away to better illustrate this last-mentioned means.

Fig. 4 is a side view of a motion picture camera containing a film magazine according to the invention, the cover of the camera being open and the cover of the magazine being removed to clarify the cooperation between the locking mechanism for the camera cover and the shutter on the film magazine.

Fig. 5 is a front elevation of the form of magazine shown in Fig. 4.

Fig. 6 is a fragmentary side elevation of a camera containing a film magazine with a section of the camera broken away to show the details of another form of lock for the camera cover.

The features and advantages of the invention will be described and explained with respect to a motion picture camera, but it is to be understood that the invention may be practiced with equal advantages in any other type of motion picture equipment. The use of the invention in connection with the camera has been selected as an example because light sealing of a film magazine under this condition is most important.

The film magazine is composed of a casing 10 having a side wall 11 and a lateral wall 12 which encircles the perimeter of said side wall 11. The film supply is provided as a film roll 13 wound on a core 14 which is rotatably supported upon a spindle 15 fastened to the side wall 11 of the casing 10. During the initial run of film through the magazine, the film is wound up on a take-up core 16 which is driven by a take-up spindle 17 to form the take-up film roll 18. During the second run of the film, the supply film roll becomes the take-up film roll and appropriate arrangements of the clutch or driving connections for the film cores in this type of magazine are disclosed in the aforementioned United States Patent of the co-inventor, Nils Bouveng, and in United States Patent No. 2,005,404. It is to be understood that any other suitable arrangement of drives for the film rolls and clutches for connecting them to drives may be used.

The film strip F in its path from the supply to the take-up film roll passes between a pair of gate members. These gate members may be of conventional design and may be composed, as shown in Fig. 1, of a front plate 19 fastened within the magazine casing 10, and of a presser pad 20 which is resiliently held against the front plate 19 or the rear surface of the film F by a spring 21.

The film magazine may also be provided with a sprocket 22 for engaging spaced portions of the film strip F, a plurality of guide rolls 23 being located in a known manner with respect to the sprocket for holding the film in engagement therewith, and for maintaining pre-formed loops in the film moving through the gate. It should also be noted that such a film sprocket can be eliminated and the film may be led directly from the supply film roll to the gate and from the gate to the take-up film roll.

The film magazine thus far described merely provides a background for the invention and embodies nothing over that shown in the United States Patent No. 1,984,111 of the co-inventor, Nils Bouveng.

The front lateral wall 12 of the magazine may be provided with an exposure aperture 24 and with an exposure aperture 25, which is both laterally and longitudinally displaced with respect to exposure aperture 24. Said front lateral wall 12 is also provided with a pair of elongated slots 26 and 27, said slots being laterally displaced to register with the marginal perforations of the film strip and being longitudinally displaced from respective exposure apertures 24 and 25 so as to permit the entrance of a tooth or claw on the film advancing mechanism of the camera into the magazine for engagement with the film perforations.

A shutter 28 is movably mounted on the magazine casing for simultaneously covering both of the exposure apertures and both of the elongated slots, but this shutter 28 is also designed or formed so that the exposure apertures may be alternatively uncovered and so that the elongated slots may be uncovered alternatively. The design and formation of the shutter 28 to function in the manner just mentioned may be accomplished in several ways, some of which are disclosed herein.

The shutter 28 may be slidably mounted on the magazine as shown in Fig. 1. In this form of the magazine, the front plate 19 is spaced from the front lateral wall 12 of the magazine casing 10 so that the shutter 28 may slide within the space provided. With the shutter 28 in the position shown in Fig. 2, both of the exposure apertures 24 and 25 and both of the elongated slots 26 and 27 are covered.

The shutter 28 carries a pair of studs 29 which extend outwardly through respective elongated openings 30 in said front lateral wall 12. Such mounting of the shutter permits movement in either direction from that shown in Fig. 2. The shutter 28 is provided with an opening 31 and with a notch 32 which are adapted upon predetermined downward movement of shutter 28 respectively to register with exposure aperture 24 and elongated slot 26 so that they are uncovered. In this position of shutter 28 the film is available through exposure aperture 24 and opening 31 for exposure, and the film perforations are accessible to the film advancing mechanism through the elongated slot 26 and notch 32. The shutter 28 is also provided with an opening 33 and with a notch 34 so that when said shutter is moved upwardly, the opening 33 will register with exposure aperture 25 and the notch 34 will register with the elongated slot 27, again rendering appropriate portions of the film strip available for exposure and for advancement.

The exposure apertures in the front wall of the magazine may be located so that there is no longitudinal displacement between them. Such location of the exposure apertures to form a double aperture is disclosed in Fig. 3. In this form of the magazine, the dual purpose exposure aperture 35 or exposure apertures 35 are provided in the front wall 12 of the casing 10 and the usual elongated slots 26 and 27 are also provided in the front wall 12, laterally spaced for registration with the film perforations and longitudinally displaced, respectively, from apertures 35 for alternative cooperation with the film advancing mechanism. The shutter 28' is mounted to slide in a longitudinal direction and carries a button 36 which extends through an elongated opening 37' in the front wall 12 of the magazine. Said shutter 28' may be mounted for the sliding movement in any suitable manner or as shown in connection with Fig. 1. The button 36 permits manual operation of the shutter 28'.

The shutter 28' is provided with an opening 37 and with an opening 38. The shutter 28' is also provided in opposite edges thereof, respectively, with a notch 39 and with a notch 40.

In the position shown in Fig. 3, and as before stated, the shutter 28' simultaneously covers the dual purpose exposure aperture 35 and both of the elongated slots 26 and 27. By pushing the button 36 upwardly, the shutter may be moved to a position indicated by the dotted circle at $a$, in which position the exposure aperture 37 registers with the left half of exposure aperture 35 and the notch 39 registers with the elongated slot 27. The film magazine is now ready for the initial run of the film through the gate.

If the button 36 is moved still farther upwardly to a position indicated by the dotted circle at $b$, the exposure aperture 38 now registers with the right half of exposure aperture 35 and the notch 40 registers with the elongated slot 26. At the same time, exposure aperture 37 and notch 39 have been moved out of registration and the left half of exposure aperture 35 and elongated slot 27 are covered in this position of shutter 28'. The film magazine is now in condition for the second run of the film therethrough. The button 36 may finally be moved to an upper extreme position designated by the dotted circle at c, in which position all of the apertures and slots in the front wall 12 are covered and the film magazine is tightly sealed against light leakage.

If the shutter of the magazine is manually movable and does not cooperate with any means on the camera for automatic location, there is the possibility of dual exposure. For instance, the operator may be confused after the second run of the film and return the button 36 from the position at b to the position at a and again operate the magazine in the camera. Obviously, that portion of the film which was first exposed will now be exposed again and ruined.

According to the invention, a means is provided between the magazine casing 10 and the shutter 28' whereby reverse or retrograde movement of the shutter 28' is prevented under normal conditions. Such a means may be any suitable one-way engaging device, such as a plurality of teeth 41 on the edge of shutter 28' and a spring pawl 42 on the side wall 11 of magazine casing 10. Obviously, the pawl 42, by engagement with teeth 41, will prevent any downward movement of the shutter 28'. However, it is desirable to provide an arrangement for releasing this means at will, such as for the reloading of the film magazine and resetting of the shutter 28' in the position shown in Fig. 3. The means permitting only one-way movement of the shutter 28' may carry a bent pin 43 which extends through the casing 10 of the magazine and which may be caught by the finger-nail of the operator to withdraw spring pawl 42 from engagement with teeth 41. During such retraction of pawl 42, the shutter 28' may be reset by moving the button 36 to the bottom of slot 37.

To assist in locating shutter 28', a spring 19' is placed in the space between the front plate 19 and front lateral wall 12, and has one end connected to shutter 28' and the other end connected to front plate 19. The teeth 41 on shutter 28' may be provided to correspond to each position of shutter 28' and spring 19' will hold said teeth 41 against the pawl 42 so that the shutter 28' will be accurately located in each of its positions.

The sliding shutter of the invention may be provided in still another form for a related, but somewhat different, type of film magazine. The laterally displaced exposure apertures of this type of magazine may be provided in opposite walls of the magazine in the manner illustrated in Figs. 4 and 5. Referring to Fig. 4, the magazine casing 10 has a side wall 11 and a lateral wall 12. The supply film roll 13 is mounted, as before, upon the core 14 and spindle 15, and the take-up film roll 18 is mounted upon the core 16 and spindle 17. A guard plate 44 of inverted U-shaped formation is fastened within the casing 10 in spaced relation to the lateral wall 12. One lateral wall 12 of this magazine is provided with an exposure aperture 45 which is located off-center, as illustrated in Fig. 5. The guard plate 44 is provided with a corresponding exposure aperture 46 in registration with said aperture 45. The opposite lateral wall 12 of the casing 10 is provided with an exposure aperture 47 which is off-set in the opposite direction and which registers with a corresponding exposure aperture 48 in the guard plate 44. The film strip, in its path from one film roll to the other film roll, passes by all of the exposure apertures 45 to 48 inclusive and is held against the guard plate 44 by suitable presser pads 49 and 50. A film guide 51 is located within the casing 10 to conduct the film strip F from one gate to the other with sufficient clearance for the take-up film roll 18. Any other film path may be employed, the only requirement being that the same film strip passes by both exposure openings.

In this form of the magazine the shutter 52 is flexible and is mounted in the space between the lateral wall 12 and the guard plate 44. A stud 53 extends through the lateral wall 12 of the casing 10 for actuation into either of the positions indicated by dotted lines at the top of Fig. 4. The end of the shutter 52, adjacent exposure apertures 45 and 46, extends beyond these apertures in the central position thereof. The opposite end of shutter 52 also extends beyond apertures 47 and 48 in this central position of the shutter. That end of shutter 52 which covers apertures 45 and 46 is provided with a notch 54, while the other end of shutter 52 is provided with a notch 55. The front wall 12 is provided with an elongated slot 56 which is adjacent to, but laterally and longitudinally displaced from, the exposure aperture 45. In the same manner an elongated slot 57 is provided in the opposite wall 12 adjacent the exposure aperture 47. Corresponding slots 58 and 59 are provided in the guard plate 44.

With the shuter 52 in the central or intermediate position shown, and as before stated, all of the exposure apertures and slots are covered. If the stud 53 is moved to the right with respect to Fig. 4, then the left-hand end of shutter 52 is raised to uncover apertures 45 and 46 and at the same time the notch 54 is moved into registration with elongated slots 56 and 58. The magazine is now in condition for the first run of the film, while the other end of shutter 52 still covers exposure apertures 47 and 48 and elongated slots 57 and 59.

Upon completion of the initial run of the film, the stud 52 is returned to central position and the magazine must be reversed with respect to the camera before the next run of the film. In said reversed position of the magazine, the stud is again moved to the right, but such movement is to the left with respect to Fig. 4. This movement of shutter 52 uncovers exposure apertures 47 and 48 which are adjacent the other end of shutter 52 and brings notch 55 into registration with elongated slots 57 and 59. Thus, during this position of the shutter 52, the other half of the film may be exposed. The shutter 52 should, of course, be returned to intermediate position before the magazine is removed from the camera. It will be noted that in this form of the magazine, as in all of the other forms, the shutter may, in one position, simultaneously cover both exposure apertures and both elongated slots, but is movable to at least two other positions, in each of which one exposure aperture and one elongated slot are alternatively uncovered.

The necessity of locating the shutter in several different positions introduces the possibility of confusion or error on the part of the operator so that the camera may be operated with the appropriate exposure aperture covered. In order to avoid this circumstance, the present invention makes provision for cooperation between the locking mechanism for the camera cover and the shutter of the film magazine in a manner to be more particularly described hereinafter in connection with Figs. 4 and 6.

The camera is of conventional design and is provided with a magazine chamber. Said camera is encased in a housing 60 on which is mounted an objective 61. A cover 62 is hinged to housing 60 and encloses the magazine chamber. The magazine casing 10 may be located within the camera by a plurality of springs 63 and a spacing bar 64 which carries a pair of studs 65. The springs 63 press the magazine against the front body portion 66 of the camera. A film advancing mechanism of any suitable design and adapted to enter the elongated slots of the magazine may be employed. By way of example only, a claw-type of film advancing mechanism has been illustrated and may comprise a rotating disc 67, a claw arm 68, which is eccentrically pivoted to disc 67 and which carries a claw 69 for entering the elongated slots in the magazine, such as elongated slots 56 and 58, to engage the film perforations, and includes a link member 70. As thus far described, the camera conforms to known design for a magazine type of apparatus.

The front body portion 66 may be provided with an off-center exposure aperture 71 which is located to register with exposure aperture 45 in the position of the film magazine as shown, and which will also register with the exposure aperture 47 when the film magazine is inverted with respect to the camera. Similarly, the claw 69 is located to enter elongated slots 56 and 58, or, when the magazine is inverted, said claw 69 will enter elongated slots 57 and 59 in the opposite wall of the magazine for movement of the film therein.

The locking mechanism for the camera cover 62 may comprise a bar 72 which is slidably mounted on the camera housing 60 by a pair of rivets 73, which has a pair of ears 74 and which carries a pin 75 extending to the exterior of camera housing 60. The pin 75 is movable within a slot 76 provided in housing 60. Said locking mechanism also includes a pair of hooks 77 on the inner surface of cover 62 and located to engage the ears 74 on slide bar 72 when it is moved to locking position.

A connection is provided between said locking mechanism and the shutter of the magazine to accomplish automatic movement of the shutter upon movement of the locking mechanism to locking position. Such a connection may be provided in several ways, but is shown as comprising a saddle-piece 78 attached to bar 72 and recessed to receive the stud 53 on the shutter 52.

After the film magazine has been properly located within the magazine chamber of the camera with the shutter 52 in intermediate position and all of the apertures and slots closed, the cover 62 is closed and the locking mechanism is moved to locking position by shoving pin 75 to the right with respect to Fig. 4. This movement of the locking mechanism through the medium of the connection, composed of saddle-piece 78 and stud 53, causes shutter 52 to move to the right and the end of shutter 52 is raised above exposure apertures 45 and 46 and notch 54 is moved into registration with elongated slot 56. The film is now available for exposure through the objective 61, camera exposure aperture 71, and the magazine exposure apertures 45 and 46. The film perforations are rendered accessible to the claw 69 of the film advancing mechanism which may now enter through elongated slot 56, notch 54, and elongated slot 58 for engagement with the film perforations and advancement of the film. After the film run has been completed, it is necessary to open the camera for inversion of the film magazine. Before the camera can be opened, the locking mechanism must be operated by moving pin 75 to the left, and such movement accomplishes closure of the claw slot and exposure aperture by moving shutter 52 over them. Thus, the magazine is completely sealed against light leakage before the cover of the camera can be opened.

After inversion of the film magazine, the cover 62 is again closed and pin 75 is moved to the right, as before. Because of the inverted position of the film magazine, this movement of the locking mechanism now moves the shutter 52 to uncover the exposure apertures and claw slots in the opposite wall. In other words, the film may now be exposed through objective 61, camera exposure aperture 71, and magazine exposure apertures 47 and 48. The film advancing mechanism is free to enter the magazine through elongated slots 57 and 59 because now the notch 55 is in registration with said elongated slots 57 and 59. It is apparent that with this cooperation between the locking mechanism of the camera and the shutter on the film magazine, there is no danger of fogging the film within the magazine.

Fig. 6 is devoted to illustrating a similar correlation between a magazine camera and the type of film magazine illustrated in Figs. 1 and 2. The camera housing 60 carries an objective 61 and the magazine casing 10 is held in place within the camera against the front body portion 66. Said front body portion 66 in this case embodies a slide bar 79, which, as before, includes a saddle-piece 80 for engaging the studs 29, a pair of ears 81, and a thumb-piece 82 which extends through a slot 83 to the exterior of the camera. The camera cover will be provided with a pair of eyelets 84, indicated by the dot-dash lines of Fig. 6, and located so as to engage the ears 81 when said locking mechanism is moved to locking position. Obviously, with upward movement of slide bar 79, the stud 29 will be moved upwardly and the opening 33 of shutter 28 will be moved into registration with exposure aperture 25 while notch 34 is also moved into registration with elongated slot 27. The shutter must be returned to the intermediate position before the camera can again be opened, and, upon inversion of the film magazine, the other stud 29 will be placed in engagement with the saddle-piece 80. Because of the inverted position of the film magazine, movement of the locking mechanism in the same direction will move the other stud 29 to bring opening 31 and notch 32 into registration, respectively, with exposure aperture 24 and elongated slot 26. Again, a combination is provided whereby the danger of fogging the film in the magazine is eliminated.

As apparent from the present disclosure, many modifications of the film magazine and of the shutter are possible. Consequently, it is to be understood that the appended claims are entitled to a great range of equivalents, and any changes constituting only slight variation of the disclosed construction are to be considered within the scope of said claims.

Having now particularly described our invention what we desire to secure by Letters Patent of the United States and what we claim is:

1. In a motion picture apparatus provided with a magazine chamber, the combination with a cover for enclosing said chamber, an objective on said apparatus, and a locking mechanism between said cover and said apparatus and movable to a locking position, of a film magazine adapted to enclose a film strip and provided with a pair of apertures, one of which is located for alignment with said objective when the magazine is in one position and the other of which is located for alignment with said objective when the magazine is in an inverted position, a shutter on said magazine for simultaneously covering said apertures and movable alternatively to uncover one of said apertures, and means between said shutter and said locking mechanism whereby said shutter is moved to uncover the aperture in alignment with said objective upon movement of said locking mechanism to locking position.

2. In a motion picture apparatus provided with a magazine chamber, the combination with a cover for enclosing said chamber, an objective on said apparatus, and a locking mechanism between said cover and said apparatus and movable to a locking position, of a film magazine adapted to enclose a film strip and provided with a pair of apertures, one of which is located for alignment with said objective when the magazine is in one position and the other of which is located for alignment with said objective when the magazine is in an inverted position, a shutter on said magazine for simultaneously covering said apertures and movable in opposite directions alternatively to uncover one of said apertures, and means between said shutter and said locking mechanism whereby said shutter is moved to uncover the aperture of the magazine which is in alignment with said objective upon movement of said locking mechanism to locking position.

3. In a motion picture apparatus provided with a magazine chamber, the combination with a cover for enclosing said magazine chamber, a locking mechanism between said cover and said apparatus and movable to a locking position, a film magazine adapted to contain a film strip provided with perforations along each margin and adapted to be placed in either of two positions within said magazine chamber, and a film engaging mechanism for engaging one row of film perforations in each position of said magazine, said magazine being provided with a pair of openings one opposite each margin of the film strip and alternatively rendering one row of film perforations accessible to said film engaging mechanism, of a shutter on said magazine and for alternatively uncovering one of said openings, and a detachable connection between said shutter and said locking mechanism for moving said shutter to uncover that opening in alignment with the film engaging mechanism when said locking mechanism is moved to locking position.

4. In a motion picture apparatus provided with a magazine chamber, the combination with a cover for enclosing said chamber, and a locking mechanism between said cover and said apparatus and movable to a locking position, of a film magazine adapted to be placed alternatively in either of two operative positions within said magazine chamber and provided with a pair of apertures, a closure means on said magazine for covering each of said apertures, and a connection between said closure means and said locking mechanism for moving said closure means to open and closed positions with respect to one of said apertures as said locking mechanism is moved to respective locking and unlocking positions.

5. In a motion picture apparatus provided with a magazine chamber, the combination with a cover for enclosing said chamber, and a locking mechanism between said cover and said apparatus and movable to a locking position, of a film magazine adapted to be placed alternatively in either of two operative positions within said magazine chamber and provided with a pair of apertures, a closure means on said magazine for covering each of said apertures, and a connection between said closure means and said locking mechanism and operative in either position of said magazine to move said closure means to open and closed positions with respect to one of said apertures as said locking mechanism is moved to respective locking and unlocking positions.

6. In a motion picture apparatus provided with a magazine chamber, the combination with a cover for enclosing said magazine chamber, a locking mechanism between said cover and said apparatus and movable to a locking position, a film magazine adapted to contain a film strip provided with perforations along each margin and adapted to be placed in either of two positions within said magazine chamber, and a film advancing mechanism for engaging one row of film perforations in each position of said magazine, said magazine being provided with a pair of slots one opposite each margin of the film strip and alternatively rendering one row of film perforations accessible to said film advancing mechanism, of a shutter on said magazine for covering both of said slots and provided with openings adapted alternatively to register with said slots, and a connection between said shutter and said locking mechanism for moving said shutter to uncover that slot in alignment with the film advancing mechanism when said locking mechanism is moved to locking position.

7. In a film magazine containing a sensitized and perforated film strip, the combination with a light-tight magazine casing adapted for detachable association with a photographic camera and including side and lateral walls provided with a pair of exposure apertures through which said film strip may be exposed and provided with a pair of claw slots through which the perforations in the film strip are accessible, of a shutter movably mounted on said casing, for covering all of said apertures and slots simultaneously, provided with openings arranged each to register alternatively with one of said apertures, and with notches arranged each to register alternatively with one of said slots, said openings and notches being relatively located so that only one exposure aperture and the corresponding claw slot are uncovered at one time.

8. In a film magazine containing a sensitized and perforated film strip, the combination with a light-tight magazine casing adapted for detachable association with a photographic camera and including side and lateral walls provided with a pair of exposure apertures through which said film strip may be exposed and provided with a pair of claw slots through which the perforations in the film strip are accessible, of a shutter mounted on said casing for movement from an intermediate position in opposite directions and into either of two extreme positions, for covering all of said apertures and slots simultaneously in said intermediate position of the shutter, arranged to uncover one of said exposure apertures and one of said claw slots in one extreme position of said shutter, and arranged alternatively to uncover the other of said exposure apertures and the other of said claw slots in the other extreme position of said shutter.

9. In a film magazine containing a film strip, the combination with a light-tight magazine casing adapted for detachable association with a photographic camera and including walls provided with a pair of apertures through which said film strip is available, of a shutter movably mounted on said casing for closing both of said openings simultaneously, provided with a pair of openings and movable in a predetermined direction to bring said openings into registration with said apertures, and a means between said shutter and said casing for preventing movement of said shutter in a direction opposite to said predetermined direction.

10. In a film magazine, the combination with a casing adapted to enclose a film strip and provided with a pair of apertures through which said film strip is available, of a shutter on said casing for closing both of said apertures simultaneously, provided with a pair of openings and movable into two extreme positions and two intermediate positions, said openings being located so that both apertures are covered in extreme positions of said shutter and so that only one of said openings registers with one of said apertures in either intermediate position, and a means between said casing and said shutter for permitting movement of said shutter from one extreme position to the other but preventing movement in the opposite direction.

11. In a film magazine containing a film strip, the combination with a light-tight magazine casing adapted for detachable association with a photographic camera and including walls provided with a double exposure aperture, of a shutter movably mounted on said casing, for closing said exposure aperture, and provided with a pair of openings for registering alternatively with said exposure aperture and uncovering only half of said aperture at a time, and a control means between said casing and said shutter, having a portion engaging said shutter to prevent movement in one direction with respect to said exposure aperture but permitting movement in the other direction.

12. In a film magazine containing a sensitized and perforated film strip, the combination with a light-tight magazine casing adapted for detachable association with a photographic camera and including side and lateral walls provided with a pair of exposure apertures through which said film strip may be exposed and provided with a pair of claw slots through which the perforations in the film strip are accessible, of a shutter mounted on said casing for movement into any of three positions, for covering all of said apertures and slots simultaneously in one position of said shutter, arranged to uncover one of said exposure apertures and one of said claw slots in another position of said shutter, and arranged alternatively to uncover the other of said exposure apertures and the other of said claw slots in still another position of said shutter.

13. In a film magazine containing a sensitized and perforated film strip, the combination with a light-tight magazine casing adapted for detachable association with a photographic camera and including side walls and lateral walls, at least two of said lateral walls being opposite and provided each with an exposure aperture through which said film strip may be exposed, of a shutter mounted on said casing for movement from an intermediate position in opposite directions and into either of two extreme positions, for covering both of said apertures simultaneously in said intermediate position of the shutter, arranged to uncover one of said exposure apertures in one extreme position of said shutter, and arranged alternatively to uncover the other of said exposure apertures in the other extreme position of said shutter.

14. In a film magazine containing a sensitized and perforated film strip, the combination with a light-tight magazine casing adapted for detachable association with a photographic camera and including side walls and lateral walls, at least two of said lateral walls being opposite and provided each with an exposure aperture through which said film strip may be exposed and provided each with a claw slot through which the perforations in the film strip are accessible, of a shutter mounted on said casing for movement from an intermediate position in opposite directions and into either of two extreme positions, for covering all of said apertures and slots simultaneously in said intermediate position of the shutter, arranged to uncover the exposure aperture and claw slot in one lateral wall of said casing in one extreme position of said shutter, and arranged alternatively to uncover the exposure aperture and claw slot in the opposite lateral wall of said casing in the other extreme position of said shutter.

NILS BOUVENG.
GEORGE A. GILLETTE, Jr.